(12) United States Patent
Palladino

(10) Patent No.: US 7,908,455 B2
(45) Date of Patent: Mar. 15, 2011

(54) LOW OVERHEAD MEMORY MANAGEMENT SYSTEM AND METHOD

(75) Inventor: Michael Palladino, San Carlos, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 621 days.

(21) Appl. No.: 12/037,943

(22) Filed: Feb. 27, 2008

(65) Prior Publication Data

US 2009/0216988 A1    Aug. 27, 2009

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. .................. 711/170; 711/202; 711/E12.002
(58) Field of Classification Search .................. None
See application file for complete search history.

(56) References Cited

U.S. PATENT DOCUMENTS

| | | | | |
|---|---|---|---|---|
| 5,623,654 | A * | 4/1997 | Peterman | 707/999.206 |
| 5,784,699 | A * | 7/1998 | McMahon et al. | 711/171 |
| 5,802,598 | A | 9/1998 | Watt | |
| 6,088,777 | A * | 7/2000 | Sorber | 711/171 |
| 6,219,772 | B1 * | 4/2001 | Gadangi et al. | 711/170 |
| 6,286,088 | B1 | 9/2001 | Campbell et al. | |
| 6,490,670 | B1 * | 12/2002 | Collins et al. | 711/173 |
| 6,499,095 | B1 | 12/2002 | Sexton et al. | |
| 6,539,464 | B1 * | 3/2003 | Getov | 711/170 |
| 7,146,479 | B2 * | 12/2006 | Li et al. | 711/170 |
| 7,266,132 | B1 * | 9/2007 | Liu et al. | 370/538 |
| 2003/0212875 | A1 | 11/2003 | Gresham | |
| 2007/0013704 | A1 | 1/2007 | MacWilliams et al. | |
| 2007/0230493 | A1 | 10/2007 | Dravida et al. | |

OTHER PUBLICATIONS

E. von Puttkamer, "A simple hardware buddy system memory allocator," IEEE Transactions on computers, vol. c-24, No. 10, Oct. 1975, pp. 953-957.

J. M. Chang, E. F. Gehringer, "A high-performance memory allocator for object-oriented systems," IEEE Transactions on computers, vol. 45, No. 3, Mar. 1996, pp. 357-366.

J. M. Chang, W. S, and C.-T. D. Lo, Hardware support for concurrent garbage collection in SMP systems, The fourth international conference/exhibition on high performance computing in the Asia-Pacific Region, vol. 1, 2000, pp. 513-517.

M. Vuletic, L. Pozzi, P. Ienne, "Seamless Hardware-Software Integration in Reconfigurable Computing Systems," Design & Test of Computers, Mar./Apr. 2005, vol. 22, No. 2, pp. 102-113.

(Continued)

*Primary Examiner* — Matt Kim
*Assistant Examiner* — Ralph A Verderamo, III
(74) *Attorney, Agent, or Firm* — King & Spalding L.L.P.

(57) ABSTRACT

A block of contiguous data storage locations of a memory is divided into pools of memory chunks. The memory chunks in same ones of the pools have equal chunk sizes. The memory chunks in different ones of the pools have different chunk sizes. In each of the pools, the memory chunks are addressable by respective chunk base physical addresses in a respective linear contiguous sequence that starts from a respective pool base physical address. The physical addresses of the memory chunks are translated into corresponding internal handles and vice versa, where each of the internal handles is smaller in size than its corresponding physical address. For each of the pools, an associated pool queue comprising respective ones of the internal handles to allocatable ones of the memory chunks in the pool is maintained.

20 Claims, 7 Drawing Sheets

OTHER PUBLICATIONS

Jason Evans, "A Scalable Concurrent malloc(3) Implementation for FreeBSD," bsdcan.org (Apr. 2006).

Witawas Srisa-an et al., "Hardware Implementation of Realloc Function," VLSI'99. Proceedings IEEE Computer Society Workshop on, pp. 106-111 (1999).

Mohamed A. Shalan, "Dynamic Memory Management for Embedded Real-Time Multiprocessor System on a Chip," School of Electrical and Computer Engineering, Georgia Institute of Technology, Nov. 2003.

Paul R. Wilson et al., "Dynamic Storage Allocation a Survey and Critical Review," University of Texas at Austin (1995).

Steven M. Donahue, "Specialized Hardware Support for Dynamic Storage Allocation," Washington University Sever Institute of Technology Department of Computer Science and Engineering (2003).

Mohamed Shalan et al, "A Dynamic Memory Management Unit for Embedded Real-Time System-on-a-Chip," International Conference on Compilers, Architecture and Synthesis for Embedded Systems (CASES '00), Nov. 2000, pp. 180-186.

* cited by examiner

LOW OVERHEAD MEMORY MANAGEMENT SYSTEM AND METHOD

BACKGROUND

A memory management system typically allocates memory from a memory pool in response to requests for memory of variable sizes. In this process, the memory management system identifies chunks of memory in the memory pool that are large enough to satisfy the requests and returns the memory addresses of those chunks. The memory management system typically also handles the return of the allocated memory chunks to the memory pool. Memory management systems typically are implemented in software. Although it is well known that hardware based memory management systems have improved performance and power characteristics relative to their software counterparts, there have only been a handful of proposals for accelerators related to memory management over the past several decades. These proposals have not been widely adopted. The few cases of prior art hardware memory managers appear to be confined to special high-end applications, which typically are less sensitive to memory management overhead than other applications, such as embedded applications.

SUMMARY

In one aspect, the invention features a machine-implemented memory management method. In accordance with this inventive method, a block of contiguous data storage locations of a memory is divided into pools of memory chunks. The memory chunks in same ones of the pools have equal chunk sizes. The memory chunks in different ones of the pools have different chunk sizes. In each of the pools, the memory chunks are addressable by respective chunk base physical addresses in a respective linear contiguous sequence that starts from a respective pool base physical address. The method additionally includes translating between the physical addresses of the memory chunks and corresponding internal handles, where each of the internal handles is smaller in size than its corresponding physical address. For each of the pools, an associated pool queue comprising respective ones of the internal handles to allocatable ones of the memory chunks in the pool is maintained.

In another aspect, the invention features an apparatus that includes a processing unit, a memory, and a memory manager that is operable to implement the inventive method described above.

Other features and advantages of the invention will become apparent from the following description, including the drawings and the claims.

DETAILED DESCRIPTION

Figure 1:
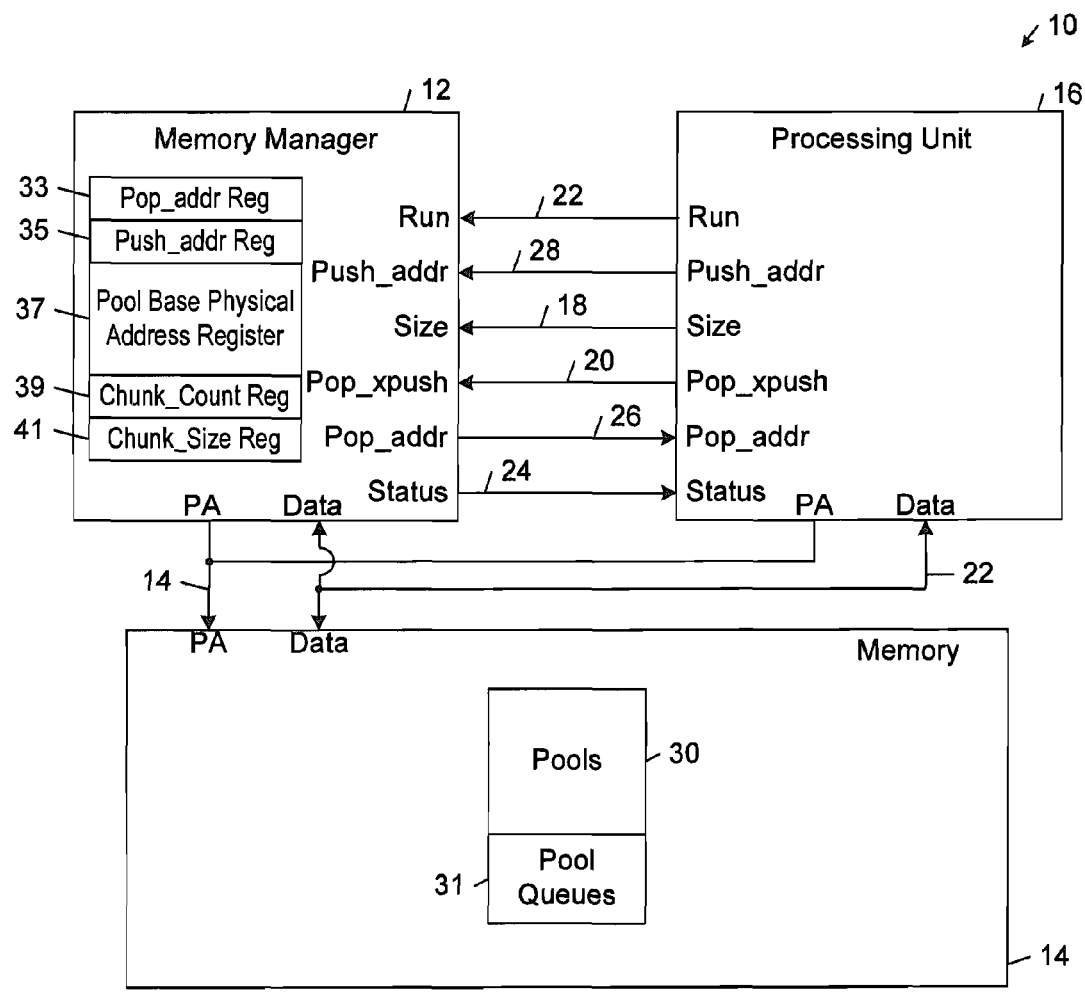
FIG. 1 is a diagrammatic view of an embodiment of a memory management system that includes a memory manager, a memory, and a processing unit.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Terms

The terms "memory" and "physical memory" are used synonymously herein to mean an actual memory circuit that is wired for read and write access, as opposed to a "virtual memory" that is defined by a processor or software.

The term "machine-readable medium" refers to any medium capable carrying information that is readable by a machine. Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein the term "register" refers to one or more contiguous data storage locations in a memory. The memory may be implemented by a random access memory or a small high-speed data storage circuit.

As used herein the term "physical address" means a unique identifier to a chunk of memory that has a corresponding unique physical address.

As used herein the term "internal handle" means a non-physical address in an internal virtual address space defined by software, a processor, or a process (e.g., a kernel process).

As used herein the term "flat memory linear addressing space" means a virtual or physical memory addressing space that is linear, sequential and contiguous from a base memory address to a final memory address that spans the entire addressing space.

As used herein the term "queue" means a buffering structure in which various elements (e.g., data or objects) are stored and held to be processed later in a specific order. Examples of queues include a FIFO (First-In, First-Out) and a LIFO (Last-In, First-Out). The term "FIFO" means a first-in, first-out type of queue in which the first element added to the queue will be the first one to be removed. The term "LIFO" means a last-in, first-out type of queue in which the last element added to the queue will be the first one to be removed.

The terms "processor" and "microcontroller" are used synonymously herein to refer to an electronic circuit, usually on a single chip, which performs operations including but not limited to data processing operations, control operations, or both data processing operations and control operations.

The terms "packet" and "data packet" are used synonymously herein to mean a block of data formatted for transmission over a network. A packet typically includes a header, which contains addressing and other information, and a payload (e.g., message data).

As used herein the term "buffer" means a region of a physical memory, which may include one or more addressable data storage locations. The term "buffer pointer" means a pointer to a buffer. The pointer typically is the starting physical address of the buffer in a memory.

II. Overview

The embodiments that are described herein provide low-overhead memory management systems and methods. These embodiments leverage the inherent structure of a chunk memory architecture that allows the use of reduced-sized addresses for managing the allocation and de-allocation of memory chunks. In this way, given the specific initialization of these embodiments, memory chunks can be managed based on the selected internal handle value and without any additional overhead requirements imposed on the clients of these embodiments. In addition, some embodiments leverage the inherent structure of the chunk memory architecture in the translation of the de-allocated physical address back to the internal handle. This feature improves processing speed because processes are not required to carry a copy of the chunk base physical address to be used when de-allocating the memory chunk.

In these ways, the embodiments that are described herein can manage the allocation and de-allocation of chunk memory with significantly reduced overhead memory requirements relative to other hardware-based memory management approaches. As a result, these embodiments readily can be incorporated into embedded applications (e.g., wireless computer peripheral devices), which have significant power, memory, and computational resource constraints.

III. Introduction

FIG. 1 shows an embodiment of a memory management system 10 that includes a memory manager 12, a memory 14, and a processing unit 16.

The memory 14 may be any type of memory circuit that is wired for read and write access. In the illustrated embodiment, the memory 14 is a random access memory (RAM) chip.

The processing unit 16 typically includes one or more data processors each of which typically is implemented by a standard processor or microcontroller. In some embodiments the processing unit 16 is a Motorola 68000 16/32-bit CISC microprocessor available from Freescale Semiconductor, Inc.

The memory manager 12 typically is implemented, at least in part, by one or more discrete data processing components (or modules) that are not limited to any particular hardware, firmware, or software configuration. These data processing components may be implemented in any computing or data processing environment, including in digital electronic circuitry (e.g., an application-specific integrated circuit, such as a digital signal processor (DSP)) or in computer hardware that executes process instructions encoded in firmware, device driver, or software. In some embodiments, process instructions (e.g., machine-readable code, such as computer software) for implementing some or all the memory management functions that are executed by the memory manager 12, as well as the data it generates, are stored in one or more machine-readable media.

In the illustrated embodiment, the memory manager includes a Pop_addr register 33 and a Push_addr register 35. The memory manager 12 also includes for each of the pools that it manages a respective Pool Base Physical Address register 37, a respective Chunk_Count register 39, and a respective Chunk_Size register 41. That is, the memory manager 12 includes a single Pop_addr register 33, a single Pus_addr register 35, and N of each of the Pool Base Physical Address register 37, the Chunk_Count register 39, and the Chunk_Size register 41, where N is the number of pools that are managed by the memory manager 12. The registers 33, 35, 37, 39, and 41 store values that are used in the process of dividing memory into pools 30 of memory chunks and the process of translating between the physical addresses of the memory chunks and corresponding internal handles.

In operation, the processing unit 16 and the memory manager 12 divide a block of contiguous data storage locations of the memory 14 into the pools 30 of memory chunks. In this process, the memory manager 12 references the memory chunks by internal handles that are stored in respective pool queues 31 in the memory 14.

Figure 2:
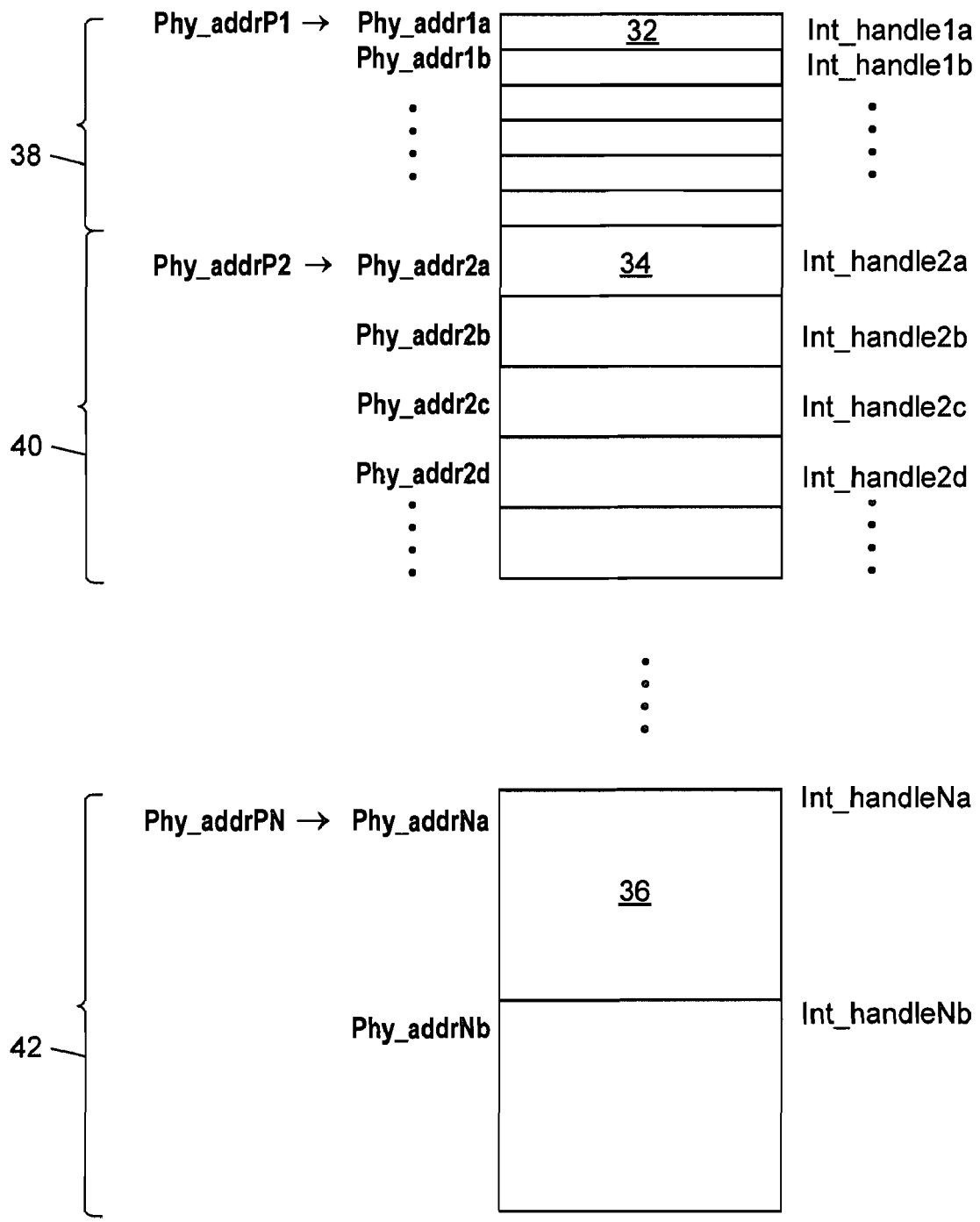
FIG. 2 is a diagrammatic view of a memory block of contiguous data storage locations divided into pools of memory chunks.

As shown schematically in FIG. 2, the memory chunks 32, 34, 36 in the same pools 38, 40, 42 have equal chunk sizes, whereas the memory chunks 32-36 in different pools 38-40 have different chunk sizes. In each of the pools 38-42, the respective memory chunks 32-36 are addressable by respective chunk base physical addresses (e.g., Phy_addr1a, Phy_addr1b, . . . , Phy_addr2a, Phy_addr2b, Phy_addr2c, Phy_addr2d, . . . , Phy_addrNa, and Phy_addrNb) in a respective linear contiguous sequence that starts from a respective pool base physical address (e.g., Phy_addrP1, Phy_addrP2, and Phy_addrPN). In some embodiments, the pool base physical addresses coincide with the physical addresses of the first memory chunks in the pools 30. Thus, in these embodiments, the memory chunks 32 in pool 38 are located starting at Phy_addrP1, the memory chunks 34 in pool 40 are located starting at Phy_addrP2, and the memory chunks 36 in pool 42 are located starting at Phy_addrPN.

The memory manager 12 translates between the physical addresses of the memory chunks 32-36 and corresponding internal handles (e.g., Int_handle1a, Int_handle1b, . . . , Int_handle2a, Int_handle2b, Int_handle2c, Int_handle 2d, . . . , Int_handleNa, and Int_handleNb), where each of the internal handles is smaller in size than its corresponding physical address.

Figure 3:
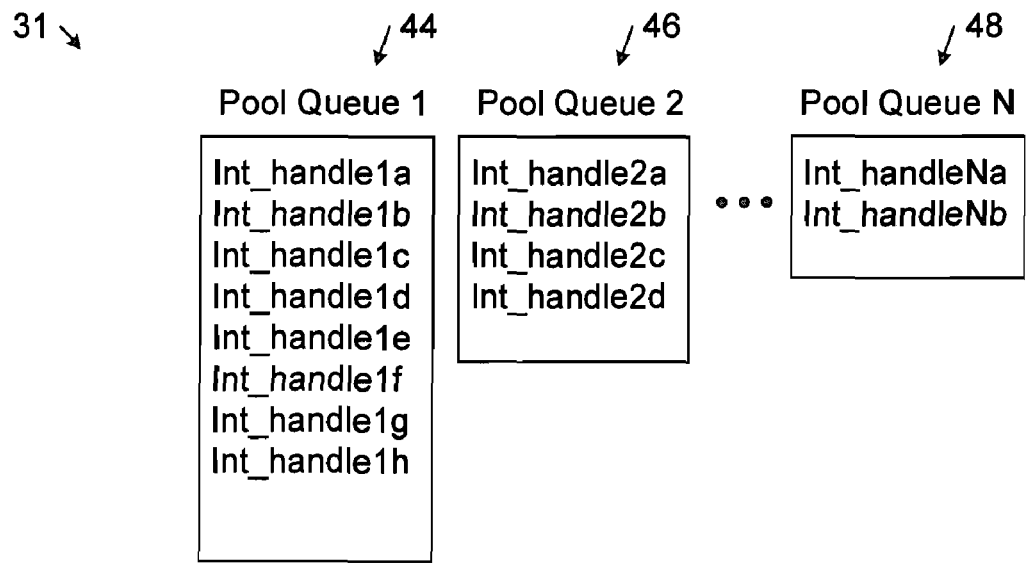
FIG. 3 is a diagrammatic view of pool queues containing respective stacks of internal handles referencing the memory chunks shown in FIG. 2.

As shown schematically in FIG. 3, for each of the pools 38-42, the memory manager 12 maintains an associated pool queue 44, 46, 48 of respective ones of the internal handles to allocatable ones of the memory chunks in the pool 38-42.

The memory manager 12 allocates and de-allocates chunks of the memory 14 in response to commands received from the processing unit 16. The communication interface between the memory manager 12 and the processing unit 16 can be implemented in a wide variety of different ways. In the embodiment illustrated in FIG. 1, for example, the processing unit 16 can pop an address from the memory manager 12 by specifying a chunk size on the Size command line 18, setting the command line Pop_xpush 20 to value "1", and setting the command line Run 22 to value "1". In response, the memory manager 12 sets the bits of the Status line 24 to report the status of the request (e.g., busy, error, or overflow). If the request is successful, the memory manager 12 will set the Status line 24 to indicate a successful request and set the Pop_addr line 26 to a pointer in the Pop_addr register 33 that references the physical address of the chunk allocated by the memory manager. The physical address of the chunk returned by the memory manager will be determined based on a best fit search for the chunk size to the requested size. When the processing unit 16 has completed using the allocated memory chunk, it can release the memory chunk for reuse by setting the Push_addr line 28 to a pointer in the Push_addr register 35 that references the physical address of any data storage location that is spanned by the memory chunk, setting the command line Pop_xpush 20 to value "0", and setting the command line Run 22 to value "0".

The memory management system 10 may be incorporated into any type of electronic device. In some exemplary embodiments, the memory management system 10 may be incorporated into a special-purpose computer system that is designed to perform one or a few dedicated functions. In some embodiments, memory management system 10 may be incorporated into a wireless transceiver module that is highly suitable for incorporation into wireless communications environments that have significant size, power, and cost constraints, including but not limited to handheld electronic devices (e.g., a mobile telephone, a cordless telephone, a portable memory such as a flash memory card and a smart card, a personal digital assistant (PDA), a video camera, a still image camera, a solid state digital audio player, a CD player, an MCD player, a game controller, and a pager), portable computers (e.g., laptop computers), computer peripheral devices (e.g., input devices, such as computer mice and keyboard), and other embedded application environments.

IV. Managing Memory

A. Overview

The memory manager 12 leverages the pooled chunk memory architecture that is described above to reduce the overhead associated with memory management.

Figure 4:
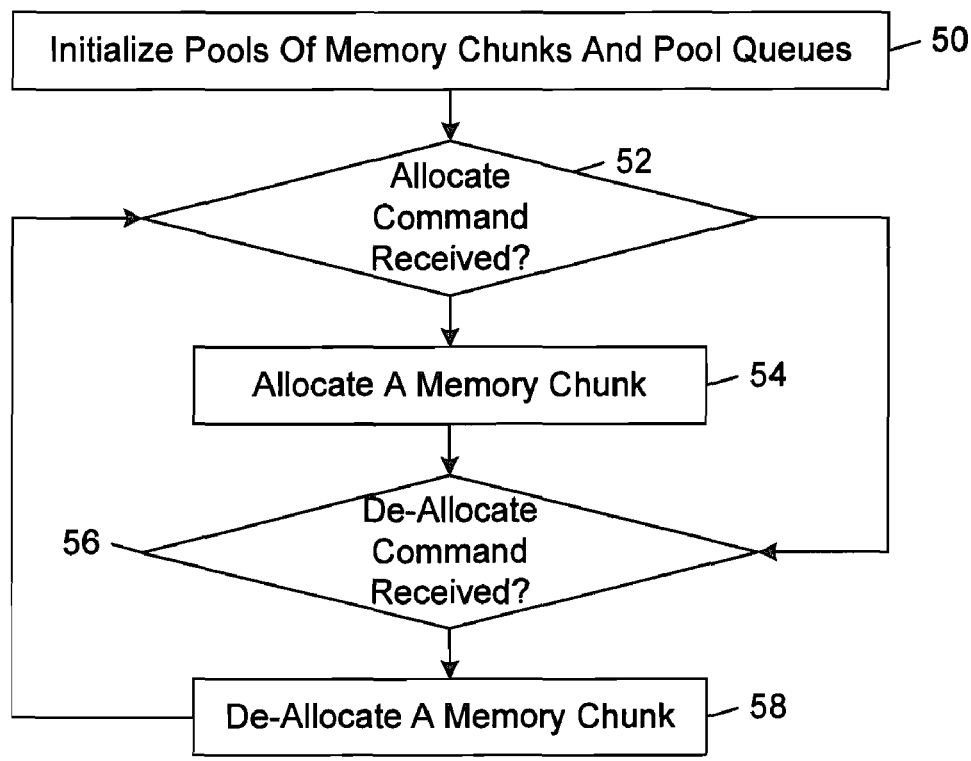
FIG. 4 is a flow diagram an embodiment of a memory management method.

FIG. 4 shows a memory management method that is implemented by an embodiment of the memory manager 12. In accordance with this method, under the control of the processing unit 16, the memory manager 12 initializes the pools 30 of memory chunks and the pool queues 31 (FIG. 4, block 50). In response to receipt of a command to allocate memory (FIG. 4, block 52), the memory manager 12 allocates a memory chunk (FIG. 4, block 54). In response to receipt of a command to de-allocate memory (FIG. 4, block 56), the memory manager 12 de-allocates a memory chunk (FIG. 4, block 58).

B. Initializing Pools of Memory Chunks and Pool Queues

Figure 5:
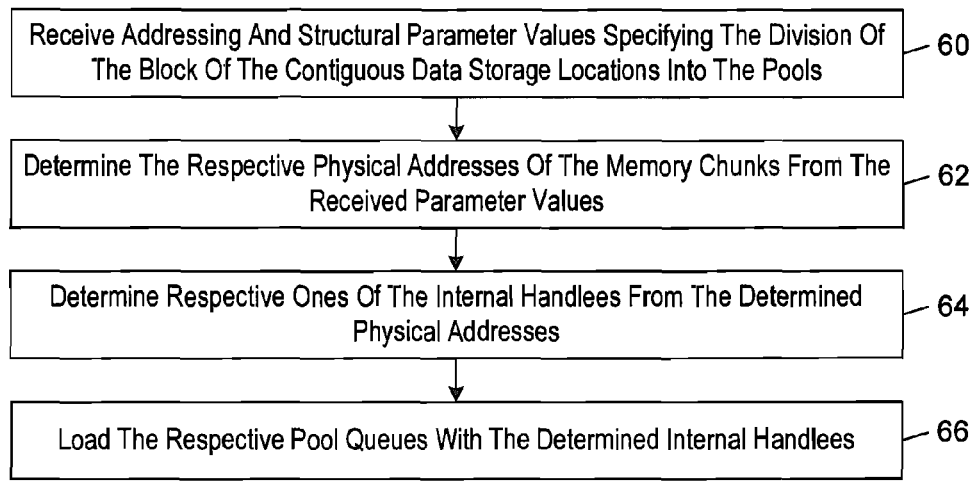
FIG. 5 is a flow diagram of an embodiment of a method of dividing a memory block of contiguous data storage locations into pools of memory chunks.

FIG. 5 shows an embodiment of a method by which the processing unit 16 and the memory manager 12 initializes the pools 30 of memory chunks and the pool queues 31 (see FIG. 4, block 50).

In accordance with this method, the processing unit 16 receives addressing and structural parameter values that specify the division of the block of the contiguous data storage locations into the pools (FIG. 5, block 60). The addressing and structural parameter values typically are contained in a configuration table that is stored in the memory 14 and is used by the processing unit 16 to configure the memory manager 12 during startup. The addressing and structural parameter values typically include: a block physical address and a block size (or range) that specify the memory block of contiguous data storage locations from which the pools 30 are divided; the number N of the pools 30; a respective chunk size, and a respective chunk count for each of the pools 30; and a base queue physical address for each of the queues 31.

The number N of pools and the respective size of the chunks within each pool typically are determined empirically for each application environment in which the memory management system 10 is deployed. In some embodiments, the number N of pools of fixed chunk sizes typically is limited to a relatively small number (e.g., $4<N<16$) and the specified chunk sizes ($CS_m$) typically are multiples of eight bytes (e.g., $CS_m=8\times m$ bytes, where m is the pool index number and m=1, 2, ..., N) in order to reduce memory management complexity, improve speed, and reduce power consumption. In some embodiments, the memory management overhead additionally is reduced by ensuring that the chunk memory addresses are eight-byte-aligned, for example, by setting the block physical address to a physical address in the memory 14 in which the last three least significant bits of the physical address are zeros.

Figure 6:
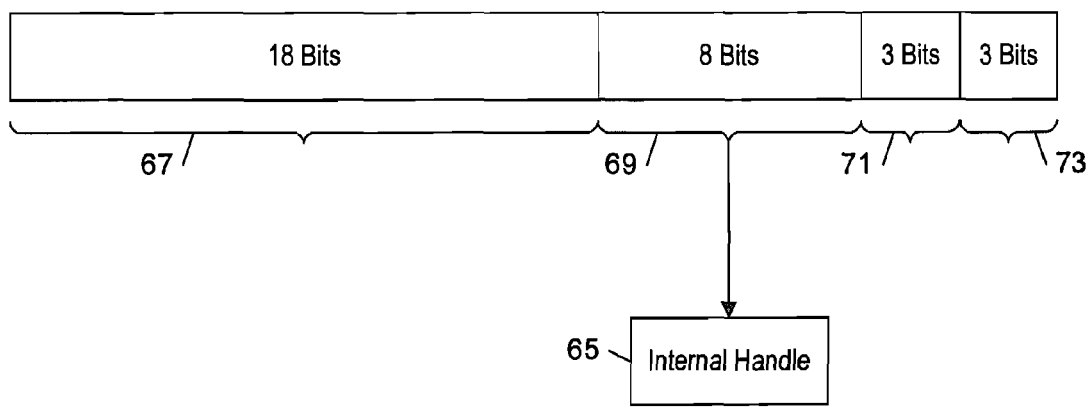
FIG. 6 shows an exemplary mapping of a 32-bit physical address to an internal handle.

FIG. 6 shows an exemplary mapping of a 32-bit physical address 63 to an internal handle 65. In this example, the managed memory block size is 16 kilobits, the managed memory block is eight-bit aligned, the minimum chunk size is eight bits, the chunk sizes are multiples of eight bits, and the minimum chunk count is eight. In this example, the internal handle 65 consists of an eight-bit segment 69 of the physical address 63. The small size of the internal handle 65 is achieved as follows. The 18 most significant bits 67 of the physical address 63 are omitted as a result of the fact that the managed memory block size is 16 kilobits. The three least significant bits 73 are omitted due to the fact that the managed memory block is eight-bit aligned, the minimum chunk size is eight bits, and the chunk sizes are multiples of eight bits. The next three least significant bits are omitted due to the fact that the minimum chunk count is eight and the chunk sizes are multiples of eight bits. As a result of this configuration, a maximum of eight bits is needed for a unique one-to-one mapping between physical address and internal handles.

Referring back to FIG. 5, the processing unit 16 then initializes the memory manager 12 with the respective physical addresses of the memory chunks (FIG. 5, block 62). In this process, the memory manager 12 is iteratively initialized with the starting physical addresses of the specified number of contiguous memory chunks of the specified chunk size for each of the pools 30. The memory manager 12 typically determines the memory chunk addresses by sequentially incrementing a memory chunk physical address index (or pointer) in an amount corresponding to the size of the preceding memory chunk. In some embodiments, the memory manager 12 stores the physical address of the first memory chunk of each pool in a respective pool base physical address register 37 in the memory manager 12 (see FIG. 1).

The memory manager 12 determines respective ones of the internal handles of the memory chunks from the determined physical addresses (FIG. 5, block 64). In this process, the memory manager 12 calculates the internal handles from the corresponding ones of the physical addresses based on the received addressing and structural parameter values. In some embodiments, the addressing and structural parameter values are incorporated into a translation process that provides a one-to-one mapping from the physical addresses to respective ones of the internal handles. The translation process typically is implemented in hardware by combinatorial logic; in some embodiments, however, the translation process is implemented in software or firmware.

In some embodiments, the process of translating physical addresses into internal handles involves extracting a respective segment from each of the physical addresses to obtain the corresponding internal handle. For example, in embodiments in which the chunk memory addresses are eight-byte-aligned, the internal handles are obtained, at least in part, by extracting from the corresponding physical addresses respective segments that exclude the last three least significant bits of the physical address. In some of these embodiments, the extracted segments additionally exclude one or more of the most significant bits that do not vary across some or all of the pools 30. For example, in one exemplary embodiment, for each of the pools 30, the extracted segments additionally exclude the most significant bits of the physical address that do not vary across the memory chunks within the pool 30. In these embodiments, the process of translating internal handles back into physical addresses involves concatenating the excluded physical address segments to each of the internal handles to reconstruct the corresponding physical address.

The memory manager 12 loads the respective pool queues 31 with the determined internal handles (FIG. 5, block 66). In this process, the memory manager 12 determines a respective base physical address of each pool queue 31 from the received addressing and structural parameter values. In some embodiments, the memory manager 12 determines the pool queue base physical addresses such that the pool queues 31 occupy a flat memory address space within the memory 14. After the pool queues 31 have been initialized, the pool queues 31 are populated by sequentially pushing the physical addresses into the memory manager 12. The memory manager 12 subsequently pushes the internal addresses onto the appropriate queues.

Figure 7:
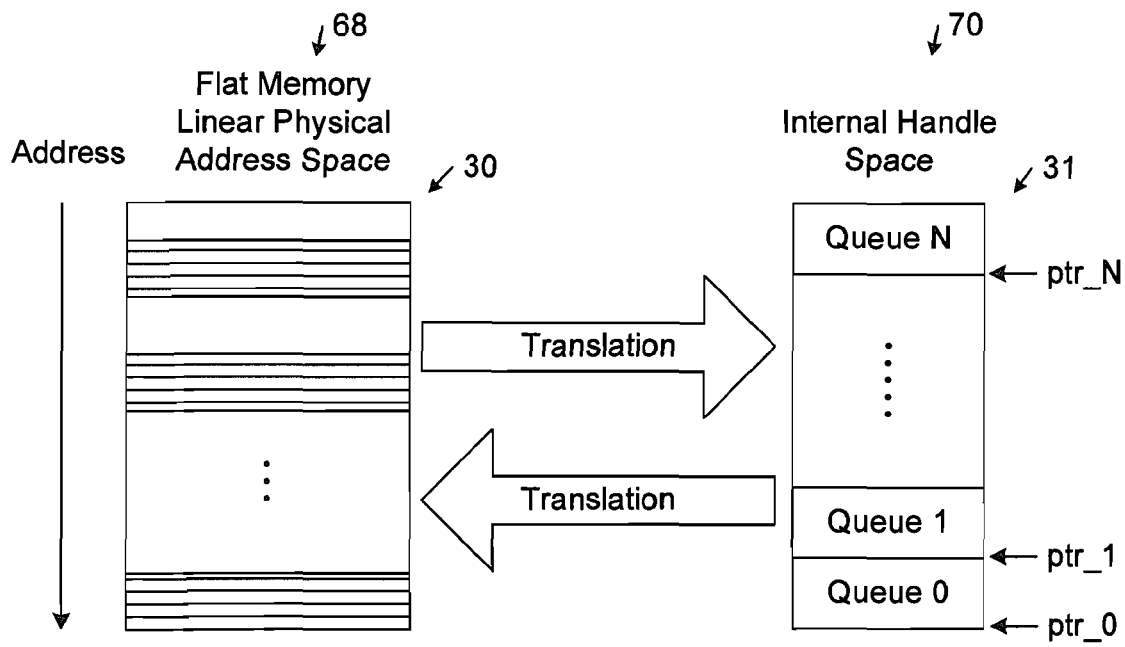
FIG. 7 is a diagrammatic view of address translations between a flat memory linear physical address space and an internal handle space.

FIG. 7 diagrammatically shows the translations between the physical addresses of the memory chunks in a flat memory linear physical address space 68 and the corresponding internal handles in an internal handle space 70. In the illustrated embodiment, each of the pool queues 31 corresponds to a respective LIFO queue that is specified by a respective queue pointer (ptr_0, ptr_1, . . . , ptr_N), which is initialized to point to the base physical address of its respective queue.

C. Allocating Memory Chunks

Figure 8:
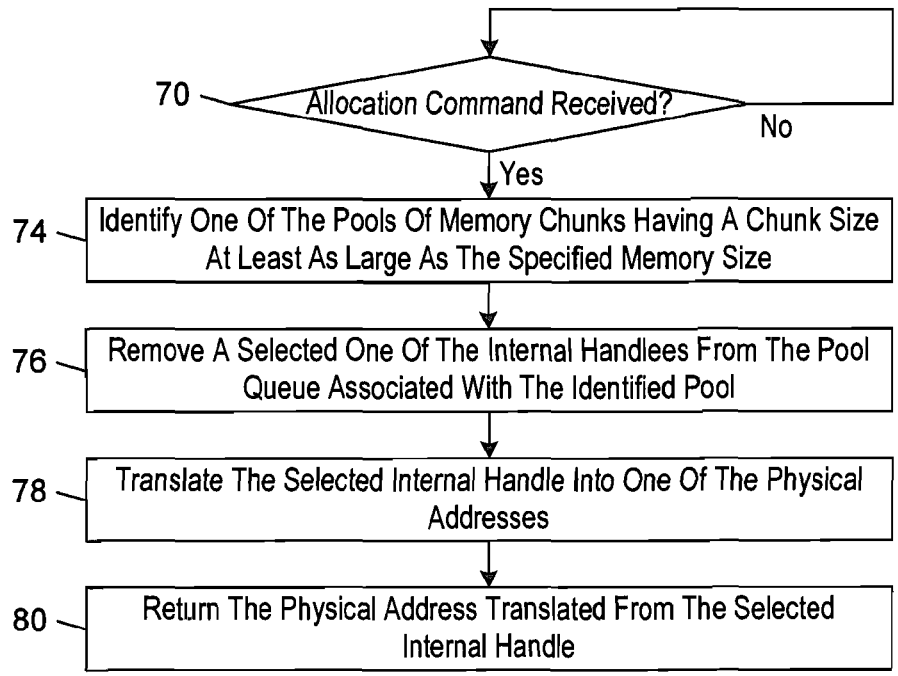
FIG. 8 is a flow diagram of an embodiment of a method of allocating memory.

FIG. 8 shows an embodiment of a method by which the memory manager 12 allocates memory chunks (see FIG. 4, block 54) in response to receipt of a command to allocate memory (see FIG. 4, block 52).

In response to receipt of a command to allocate memory (FIG. 8, block 72), the memory manager 12 identifies one of the pools of memory chunks having a chunk size at least as large as the specified memory size (FIG. 8, block 74). The allocation command typically includes a specified memory size corresponding to the size of the memory chunk that is requested by the processing unit 16. The memory manager 12 compares the requested memory size with the chunk sizes specified for the pools 30 and identifies the pool containing memory chunks that are at least as large as the requested memory size.

The memory manager 12 removes a selected one of the internal handles from the pool queue that is associated with the identified pool (FIG. 8, block 76). In this process, the memory manager 12 identifies the pool queue that is associated with the identified pool. The memory manager 12 then selects one of the internal handles in the identified pool queue in accordance with the input-output configuration of the pool queue. For example, in embodiments in which the pool queues 31 are FIFO queues, the memory manager 12 pops the oldest (i.e., first-in) internal handle from the identified pool queue. In this process, the memory manager 12 reads the internal handle pointed to by the read pointer associated with the identified pool queue. After the internal handle has been read, the memory manager 12 increments the read pointer to the next internal handle in the identified pool queue.

The memory manager 12 translates the selected internal handle into one of the physical addresses (FIG. 8, block 78). In this process, the memory manager 12 translates the selected internal handle based on the selected internal handle value and without any additional overhead requirements imposed on the clients of memory manager 12. In particular, the memory manager 12 calculates the physical addresses from the corresponding ones of the internal handles based on the received addressing and structural parameter values. In some embodiments, the addressing and structural parameter values are incorporated into a translation process that provides a one-to-one mapping from the internal handles to respective ones of the physical addresses. The translation process typically is implemented in hardware by combinatorial logic; in some embodiments, however, the translation process is implemented in software or firmware. As described above, in some embodiments, physical addresses are translated into internal handles by extracting a respective segment from each of the physical addresses to obtain the corresponding internal handle. In these embodiments, the process of translating internal handles into physical addresses involves concatenating the excluded physical address segments to each of the internal handles to reconstruct the corresponding physical address.

The memory manager 12 returns the physical address translated from the selected internal handle (FIG. 8, block 80). For example, in the embodiment described above in connection with FIG. 1, the memory manager 12 stores the translated physical address in the Pop_addr register 33, sets the Status line 24 to indicate a successful request, and sets the Pop_addr line 26 to a pointer in the Pop_addr register 33 that references the physical address of the chunk allocated by the memory manager 12.

Figure 9:
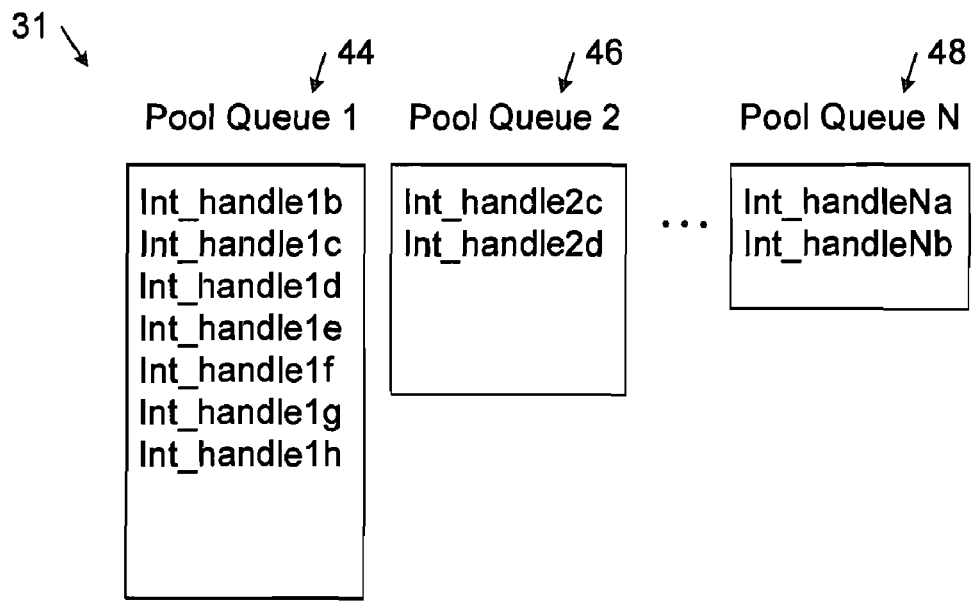
FIG. 9 is a diagrammatic view of the pool queues shown in FIG. 3 after several memory chunks have been allocated in accordance with the method of FIG. 8.

FIG. 9 shows the resulting state of the pool queues 31 of FIG. 3 after several memory chunks have been allocated in accordance with the method of FIG. 8. In particular, FIG. 9 shows the resulting state of the pool queues 31 after the first internal handle (i.e., addr1*a*) has been popped from the pool queue 44 and the first two internal handles (i.e., addr2*a* and addr2*b*) have been popped from the pool queue 46.

D. De-Allocating Memory Chunks

Figure 10:
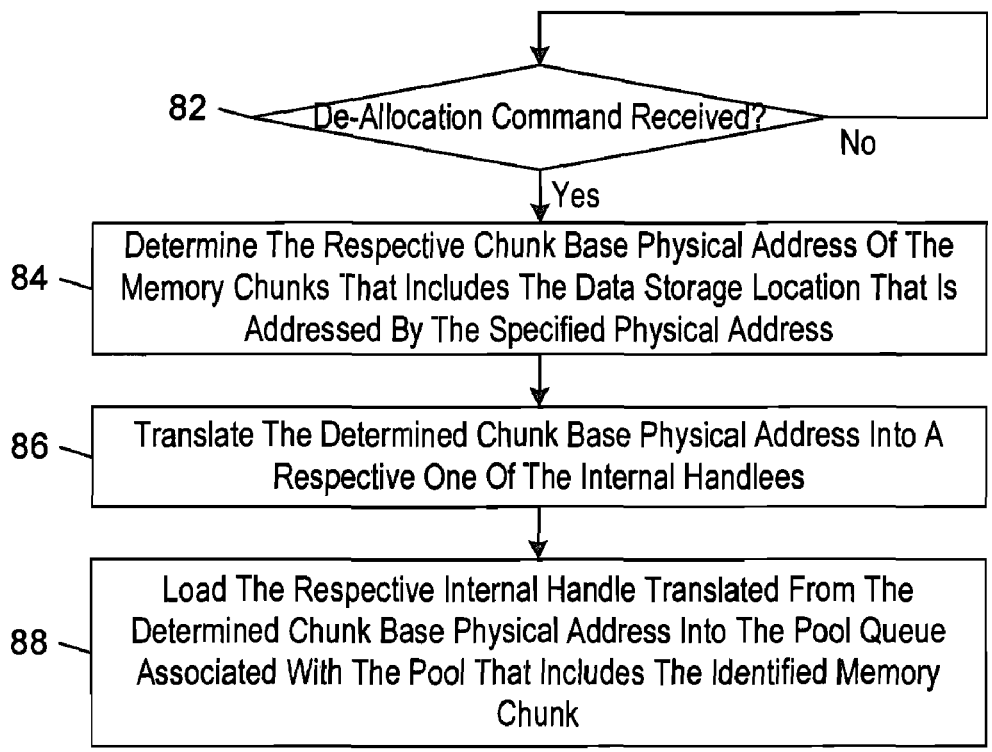
FIG. 10 is a flow diagram of an embodiment of a method of de-allocating memory.

FIG. 10 shows an embodiment of a method by which the memory manager 12 de-allocates memory chunks (see FIG. 4, block 58) in response to receipt of a command to allocate memory (see FIG. 4, block 56).

In response to receipt of a specified physical address along with a command to de-allocate memory, the memory manager 12 determines the respective chunk base physical address of the memory chunk that includes the data storage location that is addressed by the specified physical address (FIG. 10, block 82). The physical address specified in the de-allocation request may correspond to any physical address that is spanned by the memory chunk that is to be de-allocated. The memory manager 12 leverages the inherent structure of the chunk memory architecture to discover the chunk base physical address of the memory chunk to be de-allocated from any physical address that is spanned by that memory chunk. In this process, the memory manager 12 selects as the determined chunk base physical address the one of the chunk base physical addresses in the flat memory physical address space 68 that is closest to but does not exceed the specified physical address. The chunk base physical address discovery process typically is implemented in hardware by combinatorial logic; in some embodiments, however, the translation process is implemented in software or firmware.

The memory manager 12 translates the determined chunk base physical address into a respective one of the internal handles (FIG. 10, block 86). In this process, the memory manager 12 calculates the internal handles from the corresponding ones of the physical addresses based on the received addressing and structural parameter values, as described above in connection with block 64 of FIG. 5.

The memory manager 12 loads the respective internal handle that was translated from the determined chunk base physical address into the pool queue that is associated with the pool that includes the identified memory chunk (FIG. 10, block 88). In this process, the memory manager 12 pushes the translated internal handle onto its respective pool queue 31.

Figure 11:
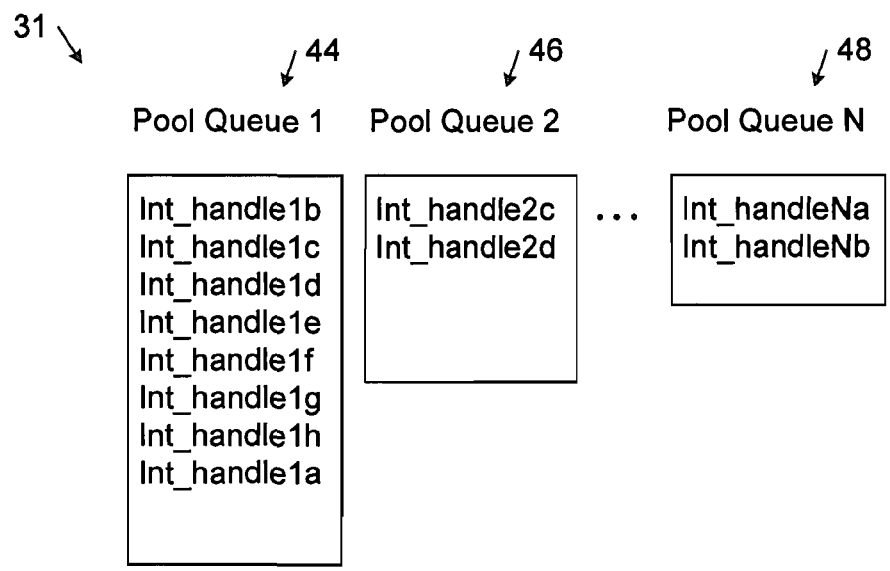
FIG. 11 is a diagrammatic view of the pool queues shown in FIG. 9 after a memory chunk has been de-allocated in accordance with the method of FIG. 10.

FIG. 11 shows the resulting state of the pool queues 31 of FIG. 9 after one of the allocated memory chunks has been de-allocated in accordance with the method of FIG. 10. In particular, FIG. 11 shows the resulting state of the pool queues 31 after the previously allocated internal handle addr1a has been pushed onto the pool queue 44.

E. Separately Managing Divided Portions of the Physical Address Space

In some embodiments, the memory manager 12 manages the entire bounded native physical address space, which typically is defined by software running on the client (e.g., a processor) of the memory manager 12.

In other embodiments, more than one instance of the memory manager 12 are used to manage different respective portions of the physical address space, where the portions of the physical address space are non-overlapping and collectively span the entire physical address space. In these embodiments, each instance of the memory manager 12 manages a smaller amount of memory and, and therefore, allows each of the memory managers to use a smaller internal handle. In some cases, the reduction in the internal handle size is such that the number of transistors needed to implement the additional instances of the memory manager 12 is less than the number of additional memory transistors needed to accommodate the larger size of the internal handle when only a single instance of the memory manager 12 is used.

V. Exemplary Memory Management Application Environments

Figure 12:
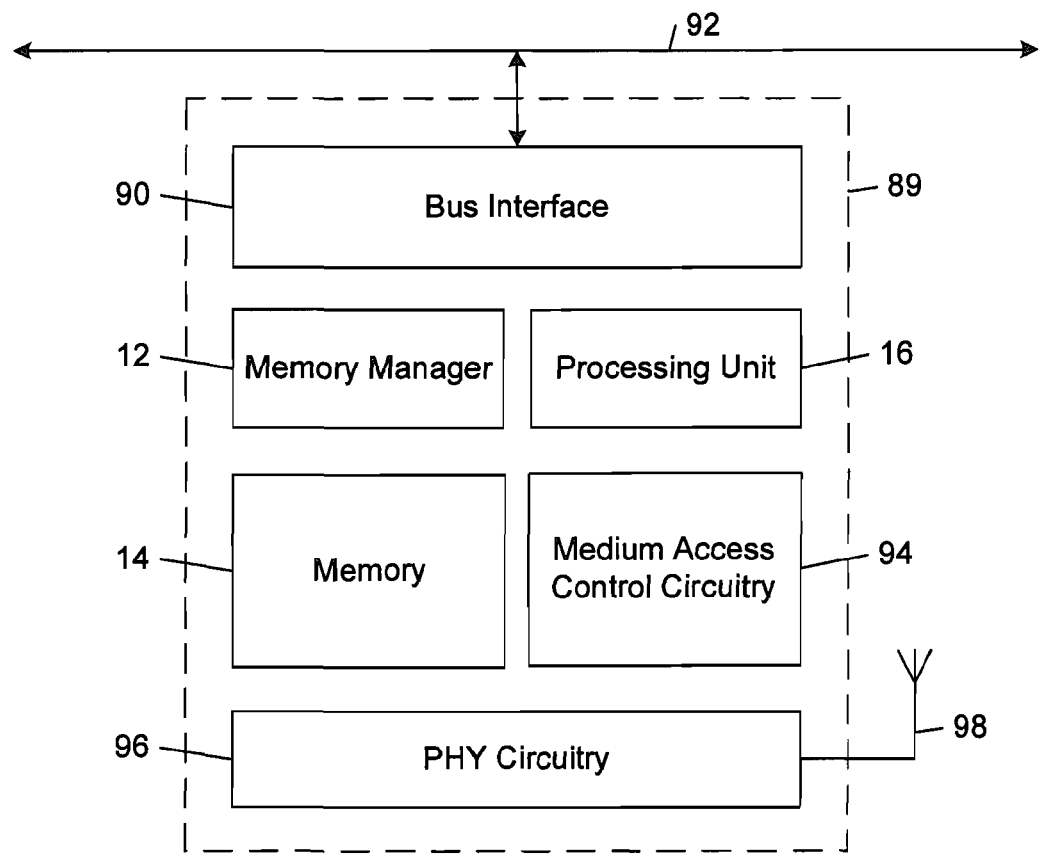
FIG. 12 is a block diagram of an embodiment of a wireless transceiver chip that incorporates an embodiment of the memory manager shown in FIG. 1.

FIG. 12 shows an embodiment of a wireless transceiver chip 89 that includes the memory manager 12, the memory 14, and the processing unit 16, a bus interface 90 for interfacing with a bus 92, medium access control (MAC) circuitry 94, physical layer (PHY) circuitry 96, and an antenna 98.

The bus interface 90 provides an input/output (I/O) interface for communications over bus 92, which may be a serial or parallel bus. In general, the bus interface 90 may communicate in accordance with any type of data link protocol, including but not limited to the serial peripheral interface (SPI) bus protocol, the queued serial peripheral interface (QSPI) bus protocol, the I²C serial computer bus protocol, and the SDIO bus protocol. In some exemplary implementations, the bus 92 is an SPI bus and the bus interface provides a synchronous serial data link between external devices (e.g., a master bus device) or processes and the wireless transceiver chip 89.

The MAC circuitry 94 provides a process connection between a remote host processor and the PHY circuitry 96. Among other functions, the MAC circuitry 94 partitions data signals that are received from the host processor and the PHY circuitry 96 into frames, and passes output signals containing the frames to the PHY circuitry 96 and the remote host processor. In some embodiments, the MAC circuitry 94 performs some or all of the MAC layer functions specified in one or more wireless communication protocols, such as the IEEE 802.11 (WiFi) protocol, the IEEE 802.15.1 (Bluetooth) protocol, or the IEEE 802.15.4 (Zigbee) protocol. In embodiments in which the MAC circuitry 94 does not perform all of the desired MAC layer functions, a driver running on a module containing the remote host processor performs the remainder of the desired MAC protocol functions.

The MAC circuitry 94 typically is implemented, at least in part, by one or more discrete data processing components (or modules) that are not limited to any particular hardware, firmware, or software configuration. These data processing components may be implemented in any computing or data processing environment, including in digital electronic circuitry (e.g., an application-specific integrated circuit, such as a digital signal processor (DSP)) or in computer hardware that executes process instructions encoded in firmware, device driver, or software. In some embodiments, process instructions (e.g., machine-readable code, such as computer software) for implementing some or all the MAC protocol functions that are executed by the MAC circuitry 94, as well as the data it generates, are stored in one or more machine-readable media.

The PHY circuitry 96 typically is implemented, at least in part, by a wireless transceiver that is operable to transmit and receive packets of data. The wireless transceiver typically includes an analog portion that interfaces with the antenna 98 and a digital portion that interfaces with the medium access control circuitry 94. The analog transceiver portion typically performs up-conversion of baseband transmit (TX) data signals that are received from the MAC circuitry 94 and outputs baseband receive (RX) data signals, which are down-converted versions of the signals received from the antenna 98. In some embodiments, the up- and down-conversion functions are performed using super-heterodyne techniques. In other embodiments, the up- and down-conversion functions are performed using direct conversion techniques. In some embodiments, the PHY circuitry 96 stores packet data in buffers that are scattered in the memory 14, reinforcing the need for the memory manager 12.

VI. Conclusion

The embodiments that are described herein provide low-overhead memory management systems and methods. These embodiments leverage the inherent structure of a chunk memory architecture that allows the use of reduced-sized is addresses for managing the allocation and de-allocation of memory chunks. In this way, memory chunks can be managed based solely on the selected internal handle value and without reference to any extraneous parameter values, such as chunk size information. In addition, some embodiments leverage the inherent structure of the chunk memory architecture in the discovery of the chunk base physical address of a memory chunk to be de-allocated from any physical address that is spanned by that memory chunk. This feature improves processing speed because processes are not required to determine the chunk base physical address before requesting the de-allocation of the memory chunks.

In these ways, the embodiments that are described herein can manage the allocation and de-allocation of chunk memory with significantly reduced overhead memory requirements relative to other hardware-based memory management approaches. As a result, these embodiments readily can be incorporated into embedded applications (e.g., wireless computer peripheral devices), which have significant power, memory, and computational resource constraints.

Other embodiments are within the scope of the claims.

What is claimed is:

1. A machine-implemented memory management method, comprising:
   dividing a block of contiguous data storage locations of a memory into pools of memory chunks, wherein the memory chunks in same ones of the pools have equal chunk sizes, the memory chunks in different ones of the pools have different chunk sizes, and in each of the pools the memory chunks are addressable by respective chunk base physical addresses in a respective linear contiguous sequence that starts from a respective pool base physical address;
   translating between the physical addresses of the memory chunks and corresponding internal handles, wherein each of the internal handles is smaller in size than its corresponding physical address; and
   for each of the pools, maintaining an associated pool queue comprising respective ones of the internal handles to allocatable ones of the memory chunks in the pool.

2. The method of claim 1, wherein the linear contiguous sequences of physical addresses collectively form a linear, sequential, and contiguous physical address space.

3. The method of claim 1, wherein the dividing comprises:
   receiving addressing and structural parameter values specifying the division of the block of the contiguous data storage locations into the pools;
   determining the respective physical addresses of the memory chunks from the received parameter values;
   determining respective ones of the internal handles from the determined physical addresses; and
   loading the respective pool queues with the determined internal handles.

4. The method of claim 3, wherein the translating comprises calculating the internal handles from the corresponding ones of the physical addresses based on the received addressing and structural parameter values.

5. The method of claim 1, wherein the translating comprises extracting a respective segment from each of the physical addresses to obtain the corresponding internal handle.

6. The method of claim 1, wherein the translating comprises concatenating one or more respective address segments to each of the internal handles to obtain the corresponding physical address.

7. The method of claim 1, further comprising in response to receipt of a specified memory size along with a command to allocate memory:
   identifying one of the pools of memory chunks having a chunk size at least as large as the specified memory size;
   removing a selected one of the internal handles from the pool queue associated with the identified pool;
   translating the selected internal handle into one of the physical addresses; and
   returning the physical address translated from the selected internal handle.

8. The method of claim 1, further comprising in response to receipt of a specified physical address along with a command to de-allocate memory:
   determining the respective chunk base physical address of the memory chunks that comprises the data storage location that is addressed by the specified physical address;
   translating the determined chunk base physical address into a respective one of the internal handles; and
   loading the respective internal handle translated from the determined chunk base physical address into the pool queue associated with the pool comprising the identified memory chunk.

9. The method of claim 8, wherein the determining comprises selecting the one of the chunk base physical addresses that is nearest without exceeding the specified physical address as the determined chunk base physical address.

10. Apparatus, comprising:
    a memory;
    a processing unit operable to perform operations comprising
        dividing a block of contiguous data storage locations of the memory into pools of memory chunks, wherein the memory chunks in same ones of the pools have equal chunk sizes, the memory chunks in different ones of the pools have different chunk sizes, and in each of the pools the memory chunks are addressable by respective chunk base physical addresses in a respective linear contiguous sequence that starts from a respective pool base physical address; and
    a memory manager operable to perform operations comprising
        translating between the physical addresses of the memory chunks and corresponding internal handles, wherein each of the internal handles is smaller in size than its corresponding physical address, and
        for each of the pools, maintaining an associated pool queue comprising respective ones of the internal handles to allocatable ones of the memory chunks in the pool.

11. The apparatus of claim 10, wherein the linear contiguous sequences of physical addresses collectively form a linear, sequential, and contiguous physical address space.

12. The apparatus of claim 10, wherein:
    in the dividing the processing unit is operable to receive addressing and structural parameter values specifying the division of the block of the contiguous data storage locations into the pools, and determine the respective physical addresses of the memory chunks from the received parameter values; and
    in the translating, the memory manager is operable to determine respective ones of the internal handles from the determined physical addresses, and load the respective pool queues with the determined internal handles.

13. The apparatus of claim 12, wherein in the translating the memory manager is operable to calculate the internal handles from the corresponding ones of the physical addresses based on the received addressing and structural parameter values.

14. The apparatus of claim 10, wherein in the translating the memory manager is operable to extract a respective segment from each of the physical addresses to obtain the corresponding internal handle.

15. The apparatus of claim 10, wherein in the translating the memory manager is operable to concatenate one or more respective address segments to each of the internal handles to obtain the corresponding physical address.

16. The apparatus of claim 10, wherein, in response to receipt of a specified memory size along with a command to allocate memory, the memory manager is operable to perform operations comprising:
identifying one of the pools of memory chunks having a chunk size at least as large as the specified memory size;
removing a selected one of the internal handles from the pool queue associated with the identified pool;
translating the selected internal handle into one of the physical addresses; and
returning the physical address translated from the selected internal handle.

17. The apparatus of claim 10, wherein, in response to receipt of a specified physical address along with a command to de-allocate memory, the memory manager is operable to perform operations comprising:
determining the respective chunk base physical address of the memory chunks that comprises the data storage location that is addressed by the specified physical address;
translating the determined chunk base physical address into a respective one of the internal handles; and
loading the respective internal handle translated from the determined chunk base physical address into the pool queue associated with the pool comprising the identified memory chunk.

18. The apparatus of claim 17, wherein in the determining the memory manager is operable to select the one of the chunk base physical addresses that is nearest without exceeding the specified physical address as the determined chunk base physical address.

19. The apparatus of claim 10, further comprising a wireless transceiver operable to transmit and receive packets of data.

20. The apparatus of claim 10, wherein the physical addresses are defined with respect to a bounded physical address space, and the memory manager performs the translating with respect to physical addresses within a first portion of physical address space; and further comprising one or more additional memory mangers operable to perform the translating with respect to physical addresses with different respective portions of the physical address space, wherein the portions of the physical address space are non-overlapping and collectively span the physical address space in its entirety.

* * * * *